US012087188B2

(12) United States Patent
Azorin

(10) Patent No.: US 12,087,188 B2
(45) Date of Patent: Sep. 10, 2024

(54) POUCH MADE FROM FLEXIBLE MATERIAL WITH LIGHT DISPLAY

(71) Applicant: DISPLAY LIGHT, Montauban (FR)

(72) Inventor: Didier Azorin, Montauban (FR)

(73) Assignee: DISPLAY LIGHT, Montauban (FR)

(*) Notice: Subject to any disclaimer, the term of this patent is extended or adjusted under 35 U.S.C. 154(b) by 0 days.

(21) Appl. No.: 17/776,970

(22) PCT Filed: Nov. 27, 2020

(86) PCT No.: PCT/EP2020/083721
§ 371 (c)(1),
(2) Date: May 13, 2022

(87) PCT Pub. No.: WO2021/105420
PCT Pub. Date: Jun. 3, 2021

(65) Prior Publication Data
US 2022/0415218 A1 Dec. 29, 2022

(30) Foreign Application Priority Data
Nov. 29, 2019 (FR) ...................................... 1913496

(51) Int. Cl.
*G09F 9/33* (2006.01)
*G09F 13/00* (2006.01)

(52) U.S. Cl.
CPC .............. *G09F 9/33* (2013.01); *G09F 13/005* (2013.01)

(58) Field of Classification Search
CPC .......... G09F 9/33; G09F 13/005; G09F 13/00; G09F 13/0413; G09F 13/0468; G09F 2013/222
See application file for complete search history.

(56) References Cited

U.S. PATENT DOCUMENTS 4,602,191 A * 7/1986 Davila .................... G09F 21/02 315/316
5,444,456 A * 8/1995 Ohta ...................... G09G 3/005 345/39

(Continued)

FOREIGN PATENT DOCUMENTS

EP 2835574 A1 2/2015
ES 1227619 U 4/2019

(Continued)

OTHER PUBLICATIONS

International Search Report and Written Opinion on corresponding PCT application (PCT/EP2020/083721) from International Searching Authority (EPO) dated Feb. 23, 2021.

(Continued)

*Primary Examiner* — Gary C Hoge
(74) *Attorney, Agent, or Firm* — Alumen IP Law PC

(57) ABSTRACT

Pouch made from flexible material for light display, the pouch having at least two plies of a flexible material, the plies defining at least two faces between which an internal space is delimited, and a light display module which is received in the internal space and which has an electronic board on which are mounted a plurality of electroluminescent diodes and a memory zone in which instructions are recorded and allow the lighting of the electroluminescent diodes to be controlled in order to create at least one predetermined display pattern.

12 Claims, 7 Drawing Sheets

(56) References Cited

U.S. PATENT DOCUMENTS

| | | | | |
|---|---|---|---|---|
| 9,611,989 | B1* | 4/2017 | Isaacson | G09F 13/0413 |
| 9,945,539 | B1* | 4/2018 | Su | A47G 1/0622 |
| 2005/0088312 | A1* | 4/2005 | Fulwiler | G09F 9/33 340/471 |
| 2005/0122716 | A1 | 6/2005 | Castelli | |
| 2008/0104870 | A1* | 5/2008 | Alden | G09F 19/08 40/422 |
| 2008/0285274 | A1 | 11/2008 | Jung | |
| 2010/0226117 | A1* | 9/2010 | Krans | G09F 13/22 28/100 |
| 2012/0062816 | A1 | 3/2012 | Tsubaki | |
| 2012/0305770 | A1* | 12/2012 | Minera | A41D 1/002 250/206 |
| 2013/0169886 | A1 | 7/2013 | Kuromizu | |
| 2013/0250559 | A1 | 9/2013 | Hawkins | |
| 2014/0310998 | A1 | 10/2014 | Shoveller | |
| 2014/0340902 | A1* | 11/2014 | Nelson | F21V 23/0435 362/249.06 |
| 2015/0253484 | A1 | 9/2015 | Arki et al. | |
| 2015/0325157 | A1 | 11/2015 | Jumblatt et al. | |
| 2016/0148558 | A1* | 5/2016 | Ernst | G06F 1/1694 345/520 |
| 2016/0293071 | A1 | 10/2016 | Shoveller | |
| 2017/0105465 | A1* | 4/2017 | Kuddo | G09F 21/02 |
| 2017/0178550 | A1* | 6/2017 | Miller | G09F 15/0062 |
| 2017/0249878 | A1* | 8/2017 | Frey | G09F 19/12 |
| 2018/0082615 | A1* | 3/2018 | Cheung | G06Q 30/0265 |
| 2018/0212116 | A1 | 7/2018 | Bastiani | |
| 2019/0082805 | A1* | 3/2019 | Tong | A45F 3/04 |
| 2020/0200338 | A1* | 6/2020 | Li | F21S 4/28 |
| 2020/0335660 | A1 | 10/2020 | Kang et al. | |
| 2021/0164639 | A1* | 6/2021 | Choi | F21V 23/001 |
| 2021/0372601 | A1* | 12/2021 | Palzkill | F21V 21/03 |
| 2022/0157206 | A1* | 5/2022 | Kay | G09F 17/00 |
| 2022/0279874 | A1* | 9/2022 | Bergman | A41D 13/11 |

FOREIGN PATENT DOCUMENTS

| | | | |
|---|---|---|---|
| WO | WO 2014/094081 | A2 | 6/2014 |
| WO | WO 2014/119148 | A1 | 8/2014 |
| WO | WO 2018/130429 | | 7/2018 |

OTHER PUBLICATIONS

Search Report from French Intellectual Property Office on related FR application (FR1857403) dated Feb. 20, 2019.

International Search Report and Written Opinion on related PCT application (PCT/EP2019/070259) from International Searching Authority (EPO) dated Sep. 11, 2019.

Non-Final Office Action on related (U.S. Appl. No. 17/266,083) dated Sep. 29, 2021.

* cited by examiner

POUCH MADE FROM FLEXIBLE MATERIAL WITH LIGHT DISPLAY

TECHNICAL FIELD

The invention relates to the field of light display and more particularly to a pouch made of flexible material in which a light display module made from a plurality of light-emitting diodes is inserted.

The invention is intended in particular to allow light display of patterns, for example for advertising purposes, in structures comprising walls made of a flexible material such as, for example, flag or kakemono type signs, blinds, valances, parasols, terrace dividers, tarpaulins, drapes, etc.

BACKGROUND

Nowadays, it is known to use illuminated signs as a night-time advertising medium. To this end, this type of sign commonly comprises a structure, for example metallic, on which light tubes are fixed. These signs are generally mounted on walls or on poles.

However, this type of device has several disadvantages. First of all, it is necessary to fix it to a solid element such as a wall or a pole, especially when its mass is significant. Then, it can be degraded by the meteorological elements or by individuals who would have direct access to it. Finally, it can represent a visual nuisance when it is not integrated into the landscape, particularly in the urban landscape.

There is therefore a need for a simple, reliable and effective solution for light displays that can at least partly remedy these disadvantages.

SUMMARY

To this end, one object of the invention is a pouch of flexible material for light display, said pouch comprising:

- at least two plies of a flexible material, defining at least two faces, between which an internal space is delimited,
- a light display module housed in said internal space and comprising an electronic board on which a plurality of light-emitting diodes are mounted and a memory area in which instructions are recorded for controlling turning said light-emitting diodes on in order to create at least one predetermined display pattern.

Thus, by means of the invention, patterns may be integrated into existing structures made of flexible material such as flags, kakemonos, blinds, parasols, valances, terrace dividers, tarpaulins, drapes, or any object made of suitable flexible material. In particular, the flexible material may be, for example, fabric such as blind, flag or parasol canvas. The pouch may have more than two plies and/or more than two faces.

According to one aspect of the invention, the electronic board comprises a microcontroller or processor configured to implement the instructions for controlling turning the light-emitting diodes on, stored in the memory area, in order to create a predetermined display pattern.

Preferably, turning the LEDs on may allow patterns such as characters, logos, images, or videos to be displayed.

According to one aspect of the invention, the at least one predetermined display pattern is displayed statically.

Preferably, the at least one predetermined display pattern is displayed dynamically in the form of an animation, for example of the flashing or scrolling type, in particular when the at least one pattern consists of several alphanumeric characters that may, for example, scroll from left to right.

Preferably, the pouch has a total thickness of less than 3 cm, in particular in order to be able to integrate harmoniously into a structure such as the aforementioned.

Preferably, the thickness of the electronic board is less than 2 cm in order to make the pouch relatively flat with a thickness of less than 3 cm, the total thickness of the layers of flexible material being then in this case preferably less than 1 cm.

In one embodiment, the pouch comprises at least one opening on at least one of its faces. This opening or these openings may be of various shapes and dimensions, for example rectangular or in the shape of an alphanumeric character or logo.

According to one aspect of the invention, the pouch comprises a transparent or translucent plate, preferably made of Plexiglas, mounted on, in or behind said at least one opening. Such a plate makes it possible to protect the electronic board and/or to improve the diffusion of the light emitted by the light-emitting diodes and/or to reduce the display glare. In addition, a translucent plate makes it possible to mask the electronic board and thus improve the aesthetics of the pouch.

Advantageously, the flexible material is bonded to the plate in order to seal the pouch.

In another embodiment, the pouch is devoid of openings on its faces, which makes it easy to manufacture.

In this case, according to one characteristic of the invention, the portion of flexible material located facing the light-emitting diodes is at least partly translucent or transparent in order to let light through to the outside of the pouch and thus to allow the at least one display pattern produced by the light-emitting diodes to be viewed through the thickness of the flexible material. The pouch may thus be perfectly integrated, or even hidden, into a structure, especially when the LEDs are turned off.

According to one characteristic of the invention, the electronic board comprises a protective varnish, for example made of silicone, in order to seal it, preferably against liquids.

Advantageously, the light display module comprises a protective casing in which the electronic board is mounted in order to protect said electronic board from external elements such as, for example, dust, flames, sunlight and/or liquids, thereby increasing its life span.

Preferably, the memory area of the electronic board is remotely programmable, for example over a wireless communication link of the wifi or Bluetooth® type, in order to modify the display pattern(s) produced by the light-emitting diodes.

Advantageously, the remote programming of the electronic board is performed using a dedicated application, for example installed on a smartphone, which makes it simple and fast.

According to one aspect of the invention, the pouch comprises an electrical energy storage battery in order to make the pouch easily transportable and installable. Such a battery may be mounted also within the internal space of the pouch or may be fixed outside said internal space.

Alternatively or additionally, the pouch is capable of being electrically connected to an electricity grid in order to be supplied with electricity.

Advantageously, the pouch comprises a solar panel to recharge the battery if necessary and/or to operate the electronic board. This panel may advantageously be mounted in the internal space of the pouch, in line with an opening formed in one of the faces of the pouch, or it may be mounted in a dedicated pouch, or it may be mounted outside the pouch and connected to the battery by an electric cable.

Advantageously, the pouch may comprise any type of device such as, for example, a scent diffuser, used for example in bakeries to diffuse pastry scents, or a sound transmitter equipped with a speaker in order to play audio programs (music, announcements, etc.).

Advantageously, the pouch comprises on the outside of at least one of its faces complementary prints of the display pattern(s) produced by turning the light-emitting diodes on in order to create a visual interaction between turning the light-emitting diodes on and said face of the pouch.

The invention also relates to a structure comprising a pouch as previously disclosed. The structure may comprise or consist of a support, such as for example a frame, a partition, a wall, a pole, a post, a cable, a rope, on which the pouch is mounted (flag, kakemono) or on which an element at least partly made of flexible material comprising the pouch (blind, parasol, terrace divider, drape, tarpaulin) is mounted.

The invention also relates to a method for manufacturing a pouch made of flexible material for light display as previously set forth, said method comprising a step of inserting the electronic board (or the protective casing comprising the electronic board) into the internal space formed between the two plies of flexible material and a step of closing the pouch. The manufacture of the pouch according to the invention is thus fast and easy because, the diodes being mounted on the electronic board, the insertion of the electronic board (or of the casing) makes it possible to place all the electronics of the device in the internal space in a single movement.

The invention also relates to a method for displaying from a pouch as previously set forth, said method comprising a step of driving the light-emitting diodes from instructions, for example implemented by the microcontroller, in order to turn the light-emitting diodes on and/or off according to a predetermined pattern, preferably dynamically to obtain a display for viewing an animation, for example by scrolling or flashing.

The invention also relates to a computer program product characterized in that it comprises a set of program code instructions which, when executed by one or more processors, configure the one or more processors to implement a display method as set forth above.

BRIEF DESCRIPTION OF THE DRAWINGS

Other features and advantages of the invention will become apparent upon reading the following description. This description is purely illustrative and should be read in conjunction with the attached drawings in which:

FIG. 4 schematically illustrates an example of a pouch comprising a complementary print of turning the light-emitting diodes on.

DETAILED DESCRIPTION

The pouch according to the invention is suitable to be integrated into an existing structure or to be mounted on a support such as a wall or a pole. In particular, the pouch may be integrated into or even constitute a flag or a kakemono or be inserted into a blind canvas, for example a roller blind, into a blind valance, a parasol canvas, a parasol valance, a terrace divider, a tarpaulin, or any structure with a suitable flexible material.

Figure 1:
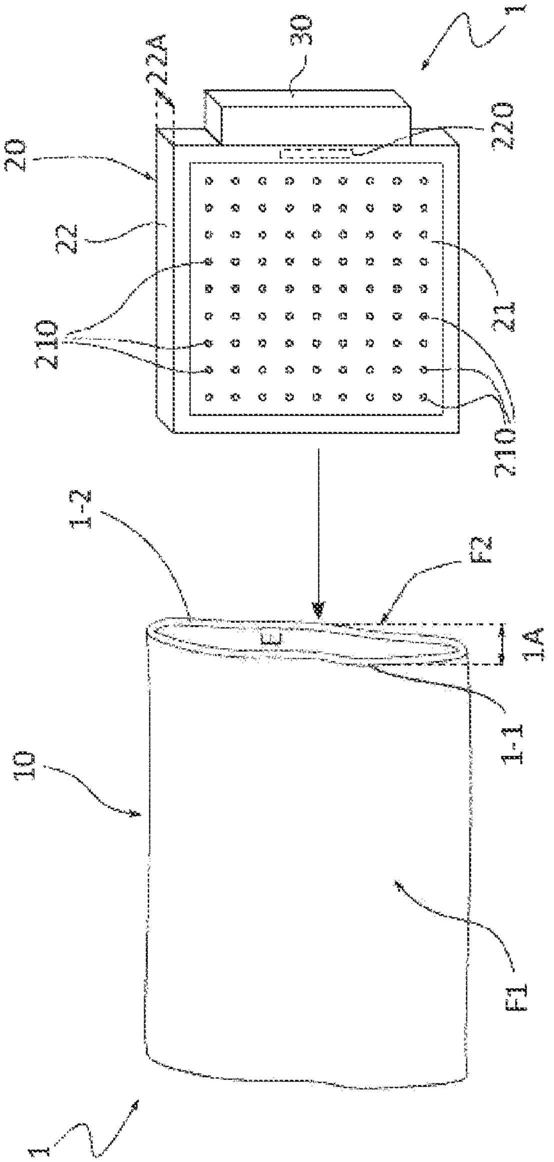
FIG. 1 is an exploded view of an example of a pouch according to the invention.
Figure 2:
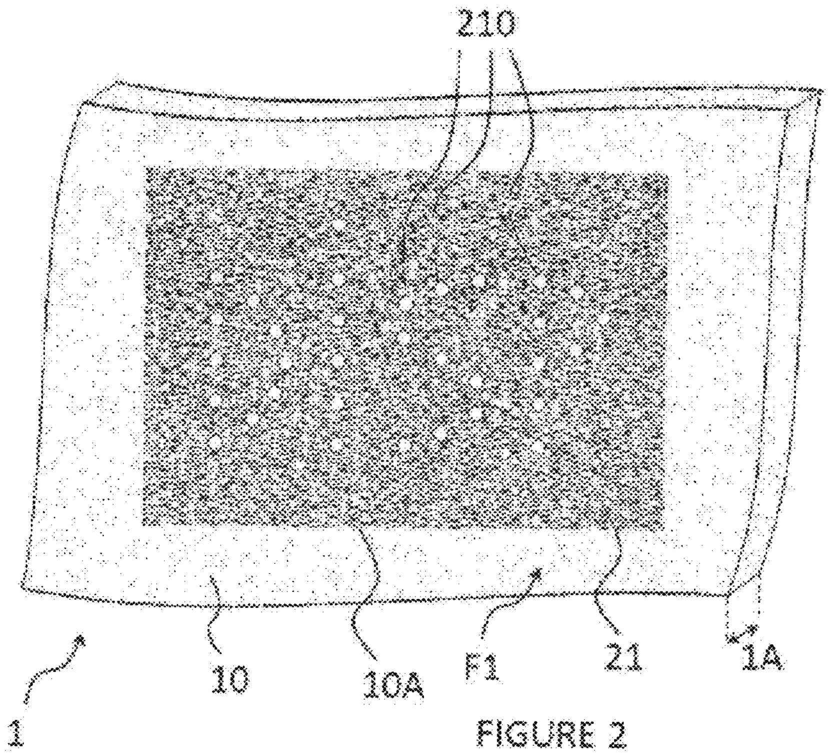
FIG. 2 schematically illustrates an example of a pouch comprising an opening on one of its faces.
Figure 3:
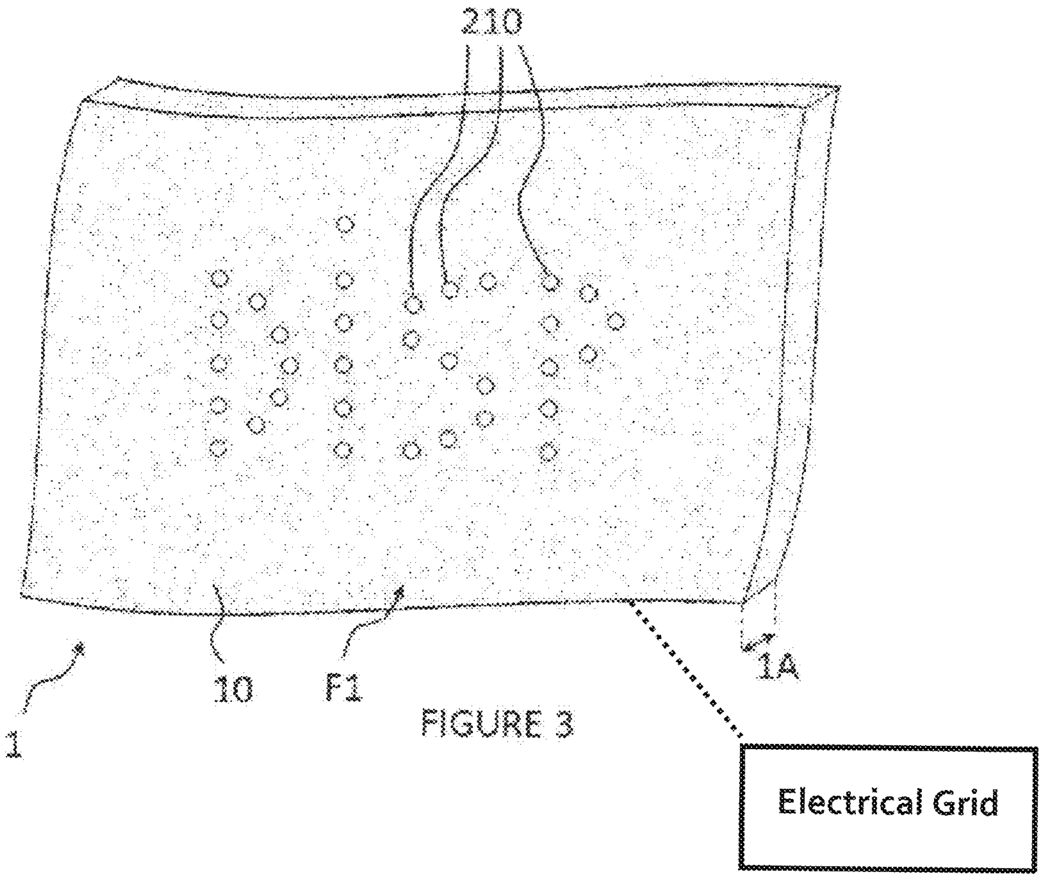
FIG. 3 schematically illustrates an example of a pouch which is devoid of openings on its faces.

An example of a pouch 1 of flexible material according to the invention is represented in [FIG. 1]. The pouch 1 comprises two plies 1-1, 1-2 of a flexible material 10, between which an internal space E is delimited, and a light display module 20, housed in said internal space E. The pouch 1 thus has two faces F1, F2. Alternatively, the pouch 1 could comprise more than two plies 1-1, 1-2 and/or more than two faces F1, F2. The flexible material 10 may for example be made of fabric or any suitable material such as, for example, blind canvas, flag canvas, parasol canvas, tarpaulin, PVC, polyester. Preferably, the pouch 1 has a total thickness 1A (that is when the light display module 20 is housed in the internal space E as illustrated in FIGS. 2 and 3) of less than 3 cm. Once the light display module 20 is housed in the internal space E, the plies 1-1, 1-2 may be bonded, sewn or fixed together by a tape of hook and loop adhesive. It will be noted that the pouch 1 may be integrated into a flexible material of an existing structure by sewing or bonding or fixing by a hook and loop tape or any other suitable fixing means or may be integral with said flexible material of an existing structure, for example by constituting the two plies of said material, in particular in the case of a flag, a kakemono, a blind canvas, etc. It will also be noted that, in other embodiments, the pouch 1 according to the invention could also be integrated into a rigid structure such as a rigid partition, a wall, etc.

Still with reference to [FIG. 1], the light display module 20 comprises a two-faced electronic board 21, for example of rectangular shape, provided with a plurality of light-emitting diodes 210 on one, the other or its two faces. More specifically, the electronic board 21 is preferably in the form of a printed circuit and comprises a plurality of electronic components comprising light-emitting diodes 210 and a memory area 220 in which instructions are stored for controlling turning said light-emitting diodes 210 on in order to create a predetermined display pattern. The electronic board 21 comprises a microcontroller or processor (not represented) configured to implement said instructions for controlling turning said light-emitting diodes 210 on in order to create a predetermined display pattern. Advantageously, the number of light-emitting diodes 210 present on a face F1, F2 of the pouch 1 is greater than or equal to fifty, preferably greater than or equal to one hundred. In one embodiment, the electronic board 21 has dimensions substantially equal to but slightly smaller than those of the internal space E in order to, once inserted into the internal space E, be held by the flexible material constituting the edges of the internal space E.

It will be noted that the electronic board could comprise more than one electronic board 21, for example two electronic boards 21 comprising light-emitting diodes 210 on one of their faces and placed back to back in the internal space E so as to illuminate the two faces F1, F2 of the pouch 1.

Figure 4:
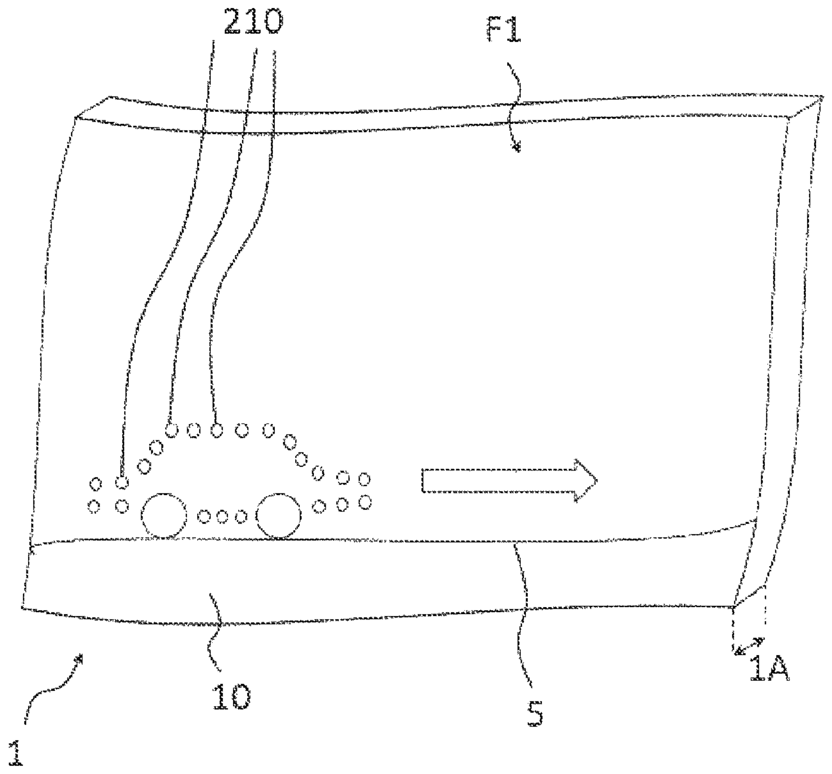

For example, turning the light-emitting diodes on 210 may allow patterns such as characters, logos, images or videos to be displayed. In particular, the patterns may be displayed statically or dynamically, for example by flashing or scrolling, as illustrated in [FIG. 4].

Preferably, the electronic board 21 comprises a protective varnish. More preferably, the electronic board 21 is housed in a protective casing 22, itself placed in the internal space E of the pouch in order to seal the electronic card 21, protecting it in particular from rainwater and flames.

Preferably, the thickness of the electronic board 21 or, when the electronic board 21 is mounted in a protective casing 22 as illustrated in [FIG. 1], the thickness 22A of the protective casing 22, is less than 2 cm in order to make the pouch 1 relatively flat with a total thickness 1A less than 3 cm.

The electronic board 21 may be programmed by replacing the memory area 220 or by modifying the instructions stored in the memory area 220, for example via a communication cable or via a wireless interface, in particular of wifi or Bluetooth® type. For example, the memory area 220 may be programmed remotely using a dedicated application installed on a smartphone.

Additionally, as in the example of [FIG. 1], the pouch 1 may comprise a battery 30 electrically connected to the electronic board 21 in order to power it electrically. This battery 30 may also be mounted in the internal space E of the pouch 1 or may be fixed outside said internal space E. In the example illustrated in [FIG. 1], the battery 30 is mounted on one side of the protective casing 22. The battery 30 could be mounted on a side of the electronic board 21.

Additionally, the pouch 1 may comprise a solar panel (not represented) in order to recharge said battery 30 or to directly power the electronic board 21. This panel may be mounted in the internal space E of the pouch 1, in line with an opening formed in one of the faces F1, F2 of the pouch 1, or it may be mounted outside the pouch 1 and connected to the battery 30 or to the electronic board 21 by an electric cable.

Alternatively or additionally, the electronic board 21 may be directly connected to a home electricity grid via an electrical cable (not represented).

A first embodiment of the pouch 1 according to the invention is represented in [FIG. 2] in which the pouch 1 comprises an opening 10A formed of the flexible material 10 on one F1 of the faces F1, F2 of the pouch 1 in order to make the electronic board 21 visible from the outside. It will be noted that in this case the pouch 1 may comprise one or more openings 10A on one F1 or the other F2 of its two faces F1, F2 or even on its two faces F1, F2. This or these openings 10A may have any shape and any dimensions.

A transparent or translucent plate (not visible in [FIG. 2]), preferably made of Plexiglas (or any suitable material), may be positioned on, in or behind the opening(s) 10A placed facing the light-emitting diodes 210 of the electronic board 21 in order to protect them and/or reduce the glare and/or improve the diffusion of light and/or conceal the electronic board 21. In this case, the portion of flexible material 10 of the pouch 1 that is in line with said plate may be bonded to said plate in order to seal the pouch 1.

A second embodiment of the pouch 1 according to the invention is represented in [FIG. 3] in which the pouch 1 is devoid of openings on its faces F1, F2. In other words, the faces F1, F2 of the pouch 1 are solid. In this case, the flexible material 10 of the pouch 1 is at least partly translucent or transparent facing the light-emitting diodes 210 in order to let light through to the outside of the pouch 1 so that the display produced by the light-emitting diodes 210 can be seen through the thickness of the flexible material 10 of the pouch 1.

For explanatory purposes, the flexible material 10 is shown in light gray and the light emitting diodes 210 when turned on are shown in white in FIGS. 2 and 3. Similarly, the electronic board 21 is shown in dark gray in [FIG. 2] to distinguish the opening 10A and the electronic board 21 from the flexible material 10. However, for clarity, the flexible material 10 and the electronic board 21 (when visible) are shown in white and the light emitting diodes 210 when turned on are shown indistinctly in white or black in FIGS. 5 to 12.

Advantageously, in both the first and second embodiments, the pouch 1 may comprise on the outside of at least one of its faces F1, F2, complementary prints of the predetermined display pattern(s) produced by turning the light-emitting diodes on 210. For example, as illustrated in [FIG. 4], the light-emitting diodes 210 may provide the animation of a motor vehicle moving from one edge to the other of the electronic board 21 on a road 5 drawn on the external wall of one F1 of the faces F1, F2 of the pouch 1. It will also be noted that one F1, the other F2 or both faces F1, F2 of the pouch 1 could comprise printed or screen-printed elements that are not complementary of the predetermined display pattern(s).

Flag

Figure 5:
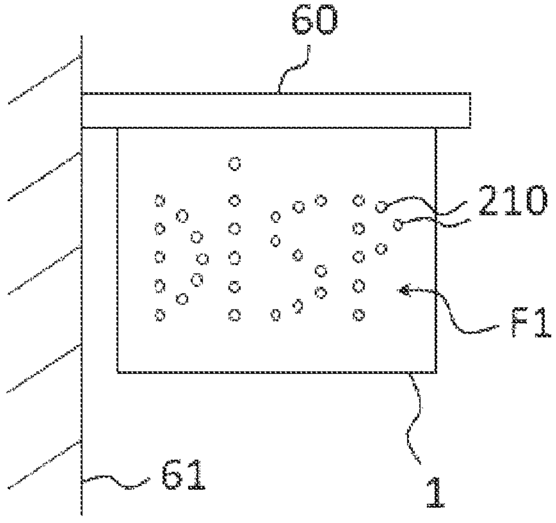
FIG. 5 schematically illustrates a first embodiment of the pouch according to the invention.

A first embodiment of the pouch 1 according to the invention is represented in [FIG. 5], in which the pouch 1 is integrated into the canvas of a flag mounted on a pole 60 fixed to a wall 61 and allows a display pattern "DISP" to be generated, which may be static or dynamic (flashing, scrolling, . . . ). In the example illustrated in [FIG. 1], the pole 60 is horizontal but it could just as well be vertical or oblique.

Kakemono

Figure 6:
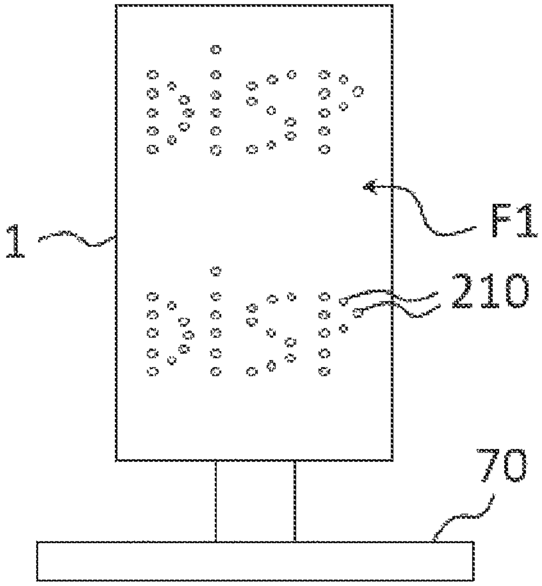
FIG. 6 schematically illustrates a second embodiment of the pouch according to the invention.

A second embodiment of the pouch 1 according to the invention is represented in [FIG. 6], in which at least one pouch 1 is integrated into the canvas of a kakemono mounted on a support 70. It will be noted that two strings of alphanumeric characters "DISP" are visible through the visible face F1 of the pouch 1. These two strings of alphanumeric characters may be generated by the same electronic board 21 housed in a single pouch 1, or by two electronic boards 21 positioned one above the other in the internal space E of the same pouch 1, or in two separate pouches 1 positioned one above the other in the flag canvas. The display patterns "DISP" may be static or dynamic (flashing, scrolling, . . . ).

Blind

Figure 7:
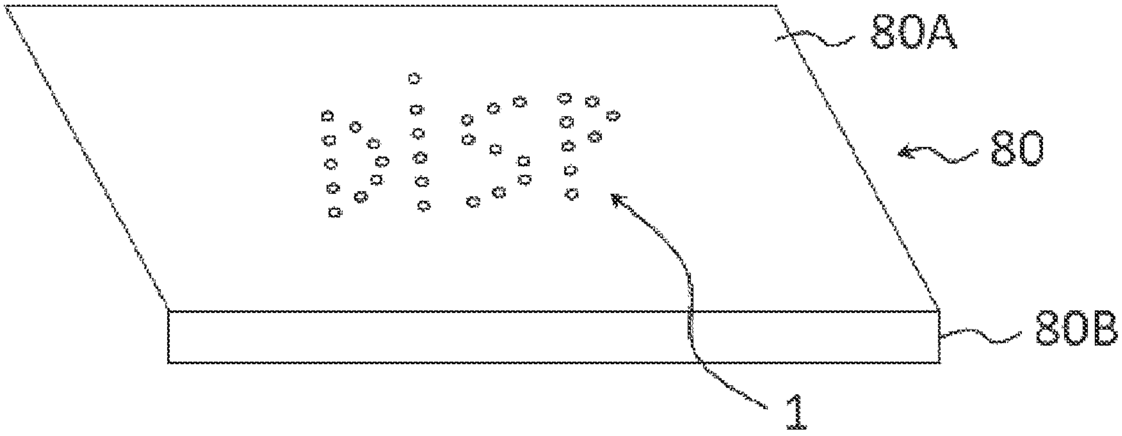
FIG. 7 schematically illustrates a third embodiment of the pouch according to the invention.

A third embodiment of the pouch 1 according to the invention is represented in [FIG. 7], in which the pouch 1 is integrated into the upper canvas 80A of a blind 80 in order to display a display pattern "DISP", which may be static or dynamic (flashing, scrolling, . . . ).

Blind Valance

Figure 8:
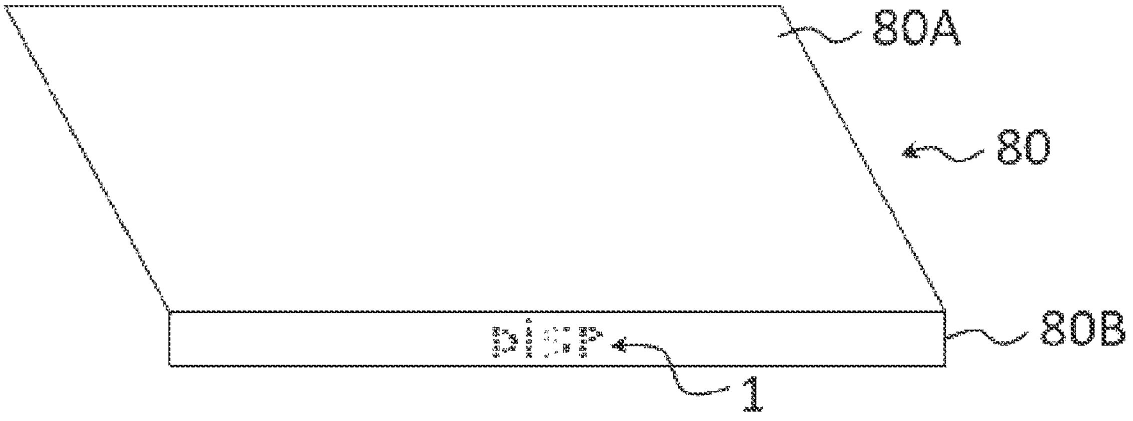
FIG. 8 schematically illustrates a fourth embodiment of the pouch according to the invention.

A fourth embodiment of the pouch according to the invention is represented in [FIG. 8], in which the pouch 1 is integrated into a valance 80B of a blind 80 in order to display a display pattern "DISP", which may be static or dynamic (flashing, scrolling, . . . ).

Parasol

Figure 9:
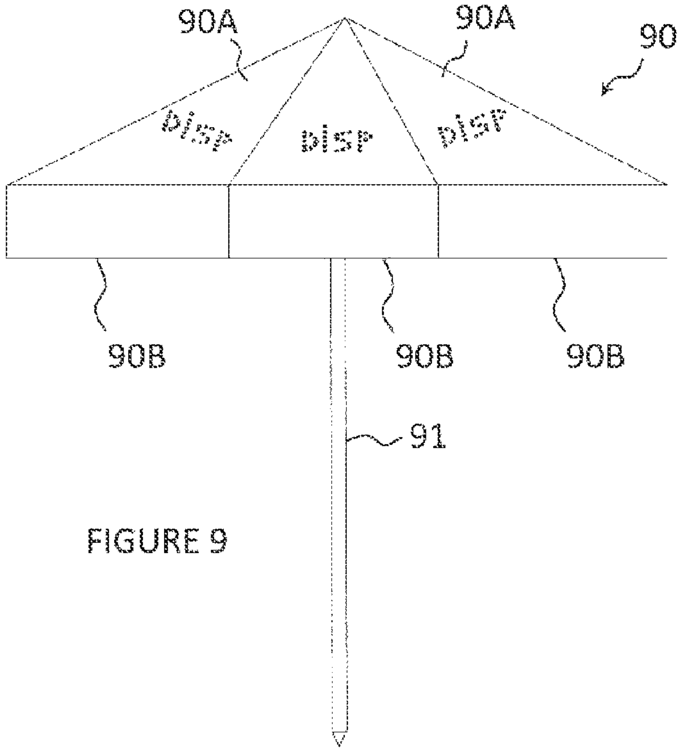
FIG. 9 schematically illustrates a fifth embodiment of the pouch according to the invention.

A fifth embodiment of the pouch 1 according to the invention is represented in [FIG. 9], in which three pouches 1 are integrated into an upper canvas 90A of a parasol 90, mounted on a stand 91 in order to each display a display pattern "DISP", which may be static or dynamic (flashing, scrolling, . . . ).

Parasol Valance

Figure 10:
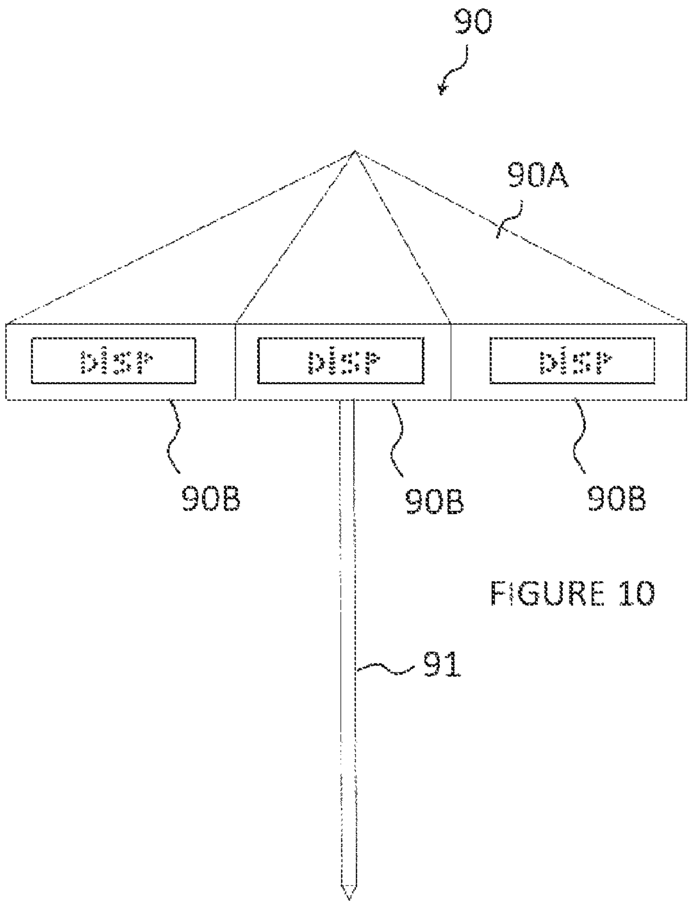
FIG. 10 schematically illustrates a sixth embodiment of the pouch according to the invention.

A sixth embodiment of the pouch 1 according to the invention is represented in [FIG. 10], in which three pouches 1 are integrated into the valances 90B of a parasol 90 in order to each display a display pattern "DISP", which may be static or dynamic (flashing, scrolling, . . . ).

Terrace Divider

Figure 11:
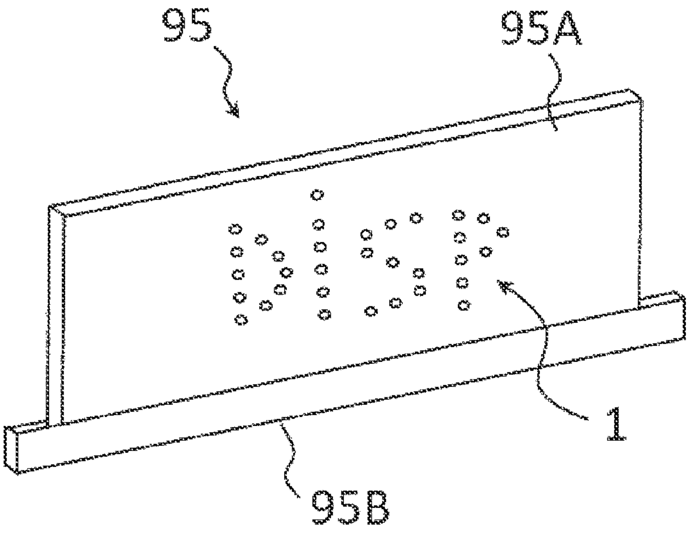
FIG. 11 schematically illustrates a seventh embodiment of the pouch according to the invention.

A seventh embodiment of the pouch 1 according to the invention is represented in [FIG. 11], in which the pouch 1 is integrated into the partition 95A of a terrace divider 95, mounted on a support 95B, in order to display a display pattern "DISP", which may be static or dynamic (flashing, scrolling, . . . ).

Roller Blind

Figure 12:
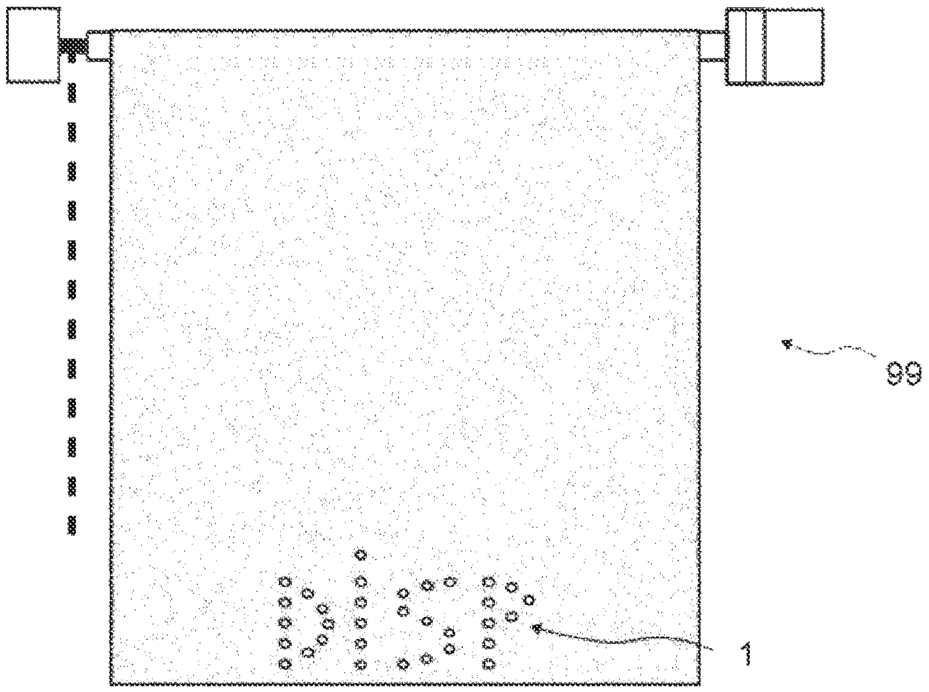
FIG. 12 schematically illustrates an eighth embodiment of the pouch according to the invention.

An eighth embodiment of the pouch 1 according to the invention is represented in [FIG. 12], in which the pouch 1 is integrated into the lower part of the flexible material of a roller blind 99. The display pattern "DISP" may be static or dynamic (flashing, scrolling, . . . ).

The pouch 1 according to the invention thus advantageously makes it possible to provide a display device, in particular an advertising display device, from flexible material that can be integrated into many known structures.

The invention claimed is:

1. A pouch of flexible material for light display, said pouch comprising:

at least two plies of a flexible material, defining at least two faces, between which an internal space is delimited, a light display module housed integrally in said internal space, said light display module comprising an electronic board on which a plurality of light-emitting diodes are mounted and a memory area in which instructions for controlling turning of said light-emitting diodes on are recorded in order to create at least one predetermined display pattern, and wherein said pouch comprises at most one opening on each of its faces and said pouch comprising at least one opening on at least one of its faces.

2. The pouch according to claim 1, wherein the at least one predetermined display pattern is displayed statically or dynamically.

3. The pouch according to claim 1, said pouch having a total thickness of less than 3 cm.

4. The pouch according to claim 1, said pouch comprising a plate, mounted on, in or behind said at least one opening.

5. The pouch according to claim 1, said pouch being devoid of openings on its faces.

6. The pouch according to claim 5, wherein the portion of flexible material located facing the light-emitting diodes is at least partly translucent or transparent.

7. The pouch according to claim 1, wherein the light display module comprises a protective casing in which the electronic board is mounted, the thickness of said casing being less than 2 cm.

8. The pouch according to claim 1, wherein the memory area of the electronic board is remotely programmable in order to modify the at least one display pattern produced by the light-emitting diodes.

9. The pouch according to claim 1, said pouch comprising a battery or being capable of being electrically connected to an electricity grid.

10. The pouch according to claim 1, said pouch comprising on the outside of at least one of its faces complementary prints of the at least one display pattern produced by turning the light-emitting diodes on.

11. The pouch according to claim 1, said pouch being suitable to be integrated into a structure or mounted on a support.

12. A structure comprising the pouch according to claim 1.

* * * * *